G. T. OLSON.
HAND REEL.
APPLICATION FILED APR. 3, 1912.
1,047,113.
Patented Dec. 10, 1912.
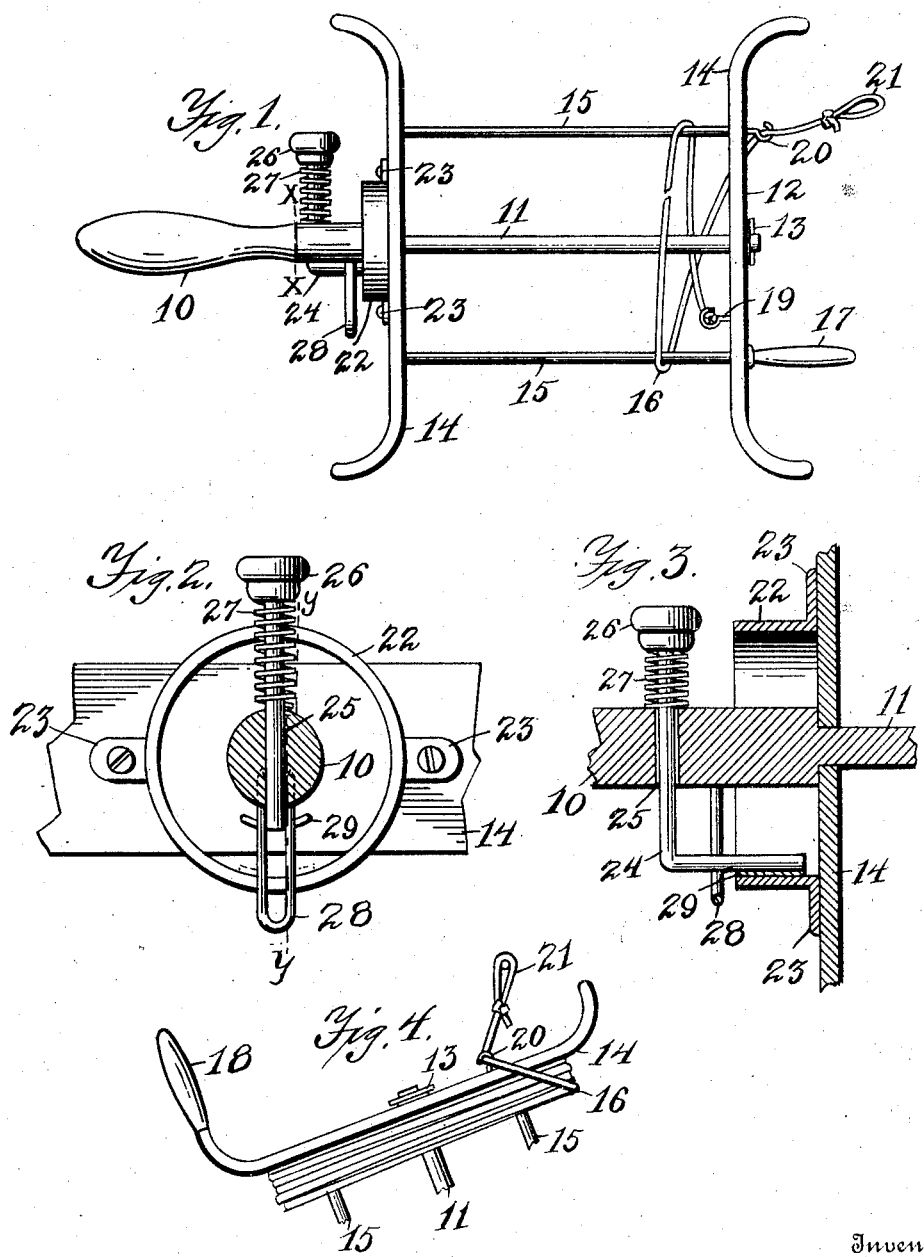
Witnesses
Arthur O. Morse.
H. U. Harris
Inventor
Gust T. Olson
By S. Arthur Baldwin
Attorney

UNITED STATES PATENT OFFICE.

GUST T. OLSON, OF JAMESTOWN, NEW YORK.

HAND-REEL.

1,047,113.  Specification of Letters Patent.  Patented Dec. 10, 1912.

Application filed April 3, 1912. Serial No. 688,321.

*To all whom it may concern:*

Be it known that I, GUST T. OLSON, a citizen of the United States, residing at Jamestown, in the county of Chautauqua and State of New York, have invented certain new and useful Improvements in Hand-Reels, of which the following, taken in connection with the accompanying drawings, is a specification.

The invention relates to a device for handling clothes lines as well as lines for other purposes which it is desirable to reel and unreel in order to conveniently care for the same; and the object of my improvement is to provide a hand reel upon which a line may be quickly and easily wound, and to provide also a manually controlled brake for such reel; and the invention consists in the construction and combination of the parts as shown in this specification and the accompanying drawings, and pointed out in the claims.

In the drawings Figure 1 is an elevation of the hand reel with a line attached thereto and showing the brake for the same. Fig. 2 is a sectional view at line X X in Fig. 1 showing an elevation of the brake for the reel. Fig. 3 is a sectional view at line Y Y in Fig. 2 showing the construction and arrangement of the brake so that it can be manually controlled by means of pressure upon the brake. Fig. 4 is an elevation of a portion of the reel showing the manner of hanging the reel and at the same time holding the reel against unwinding.

Like numerals of reference refer to corresponding parts in the several views.

The numeral 10 designates the handle of the reel, which has an extension or rod 11 extending therefrom upon which the reel 12 is revolubly mounted, being preferably held in place by means of a key or nut and washer 13. The reel 12 is preferably composed of the two side pieces 14, having outwardly curved ends so that the line will be easily gathered upon the reel. The sides 14 are connected by means of rods 15 which are placed a spaced distance apart and upon which the line 16 is wound. One of the rods 15 is preferably extended in the handle 17 for turning the reel, though one of the curved projections of the reel sides 14 might be extended into the handle as shown at 18 in the modification shown in Fig. 4, and not depart from my invention.

In order to attach line 16 to the reel 12 a catch, preferably in the form of a partially opened screw eye or hook 19, is provided into which the knotted end of the line 16 may be easily and quickly inserted, thereby holding one end of the line 16 firmly in place. After the line is reeled, or part of the same, it is caught in a second partially opened screw eye or hook 20, and it is apparent that the draw of the line 16 upon the reel 12 and the screw eye 20 will hold the reel 12 from turning and thereby unwinding the line 16, and that the hand reel may be hung up as shown in Fig. 4, by means of the loop 21 in the end of the line 16. It is also obvious that when it is desirable to use only a part of the line 16 the remainder of the line may be left wound upon the reel 12 by simply slipping the line through the catch 20 and letting it hang from the attaching nail or hook.

In order to control the winding and unwinding of the line by turning the reel 12, a thumb operated brake is provided which consists of a ring 22 which is attached by means of lugs 23 to the side of the reel 12 or piece 14 adjacent to handle 10, the ring 22 extending around the end of the handle 10 adjacent to the reel 12. The inner wall of the ring 22 is preferably smooth, though it may be serrated or otherwise roughened without departing from my invention.

An angular brake rod 24 is inserted through a hole 25 in the handle 10 at a spaced distance from the ring 22 so that the angular end of the brake rod 24 extends within the ring 22 and may be pressed against the inner wall of said ring. A pressure button 26 is attached to the end of brake rod 24 and a coiled spring 27 is placed between the button 26 and the handle 10 around the brake rod 24. In order to guide the brake rod 24 firmly in line, a staple 28' is driven into the handle 10 and extends on each side of the brake rod 24 thereby holding it firmly in line. A curved brake shoe 29 may be attached to brake rod 24 to bear against the inner wall of the ring 22, though this is not always necessary.

In order to use the hand reel the line 16 is wound upon the same by attaching one end in the screw eye 19 as hereinbefore described and turning the reel by means of the handle 17 or 18 with one hand while the reel is held by the handle 10 in the other. When the entire line is wound upon the reel 12 the line 16 is inserted through the catch 20 and it may be hung by the loop 21 in the end of the line.

It is apparent that the line 21 may be inserted in the catch 20 at any point throughout the length of said line and the reel and line allowed to hang, thereby holding the reel 12 from rotation. The line 21 being held at one end by the catch 19, and at the point of divergence from the reel by the catch 20. This arrangement makes the use of the handle reel exceedingly convenient for housekeepers with clothes lines, or for other users of lines, since a portion of the line may be unreeled and the line may then be caught under the catch 20 and the reel and line allowed to hang, as shown in Fig. 4.

When, it is desired to control or retard the revolution of the reel 12 in unwinding or winding the line 16, the thumb of the hand clasping the handle 10 may be pressed upon the thumb nut 26 thereby pressing the angular end of the brake rod 24 against the inner wall of the ring 22 with any desired pressure to completely stop the wheel or to retard its motion.

I claim as new—

1. A device of the class described comprising a handle, a line reel rotatably mounted on said handle, a handle on said reel to rotate the same, a ring on said reel around said handle on the side adjacent thereto, an angular rod extending through said handle, a thumb nut on said rod, a spring between said thumb nut and handle, said angular rod extending within said ring to be manually pressed against the same and control said reel.

2. A device of the class described comprising a handle, a clothes line reel rotatably mounted on said handle and means for rotating the same, a ring attached to said reel around said handle on the side adjacent thereto, an angular rod extending through said handle and into said ring, a thumb nut on said rod, a spring between said thumb nut and said handle to normally hold said rod out of contact with said ring, a brake shoe on said rod within said ring, and a guide on said handle for said rod, substantially as and for the purpose specified.

In testimony whereof I have affixed my signature in the presence of two witnesses.

GUST T. OLSON.

Witnesses:
H. U. HARRIS,
ARTHUR O. MORSE.